United States Patent [19]
Gerber et al.

[11] Patent Number: 5,852,517
[45] Date of Patent: Dec. 22, 1998

[54] LOW PROFILE OPTICAL DEVICE WITH MULTIPLE MOUNTING CONFIGURATIONS

[75] Inventors: Paul-Martin Gerber, Munich, Germany; Marvin Lumbard, Los Gatos, Calif.

[73] Assignee: Siemens Microelectronics, Inc., Cupertino, Calif.

[21] Appl. No.: 946,688

[22] Filed: Oct. 8, 1997

Related U.S. Application Data

[63] Continuation of Ser. No. 555,557, Nov. 8, 1995, abandoned.

[51] Int. Cl.$^6$ ........................................ G02B 7/02
[52] U.S. Cl. .......................... 359/811; 359/808; 359/819; 385/33; 250/227.11
[58] Field of Search .................... 359/811, 819, 359/800, 808, 809, 810; 250/215, 227.11, 227.24; 385/33, 22

[56] References Cited

U.S. PATENT DOCUMENTS

| | | | |
|---|---|---|---|
| 5,191,480 | 3/1993 | Murray et al. | 359/808 |
| 5,412,509 | 5/1995 | Nakata et al. | 359/811 |
| 5,485,318 | 1/1996 | Lebby et al. | 359/811 |
| 5,539,200 | 7/1996 | Lebby et al. | 250/227.11 |
| 5,615,052 | 3/1997 | Doggett | 359/811 |
| 5,633,762 | 5/1997 | Richard | 359/811 |

OTHER PUBLICATIONS

TFDS 3000 Data Sheet, Temic Telefunken Microelectronic GmbH, Theresienstrasse 2 Postfach 3535, 74025 Heilbronn, Germany.

Preliminary Technical Data, HSDL–1000, Hewlett–Packard Company, 3000 Hanover Street, Palo Alto, CA 94043.

*Primary Examiner*—Loha Ben

[57] ABSTRACT

An optical send-receive module includes a frame which has a front section, a back side, and a top section. A lens carrier is attached to the front section of the frame. The lens carrier includes one or more lenses which face forward. An integrated circuit carrier is placed within the top section of the frame. First metal leads electrically connect components within the lens carrier to an integrated circuit within the integrated circuit carrier. Second metal leads extend from the integrated circuit carrier, along the top section of the frame, down the back side of the frame and are bent under the frame.

16 Claims, 11 Drawing Sheets

LOW PROFILE OPTICAL DEVICE WITH MULTIPLE MOUNTING CONFIGURATIONS

CROSS-REFERENCE TO RELATED APPLICATION

This is a continuation of Ser. No. 08/555,557 filed Nov. 8, 1995, now abandoned.

BACKGROUND

The present invention concerns optical devices and particularly a low profile optical device which has various possible mounting configurations.

In recent years, there continues to be a trend to light-weight portable communication systems, such as portable computers, mobile accessory units and cellular phones. These portable devices require new technologies to achieve the goals of small size, light weight and convenience for users. One of the most important new technological areas is wireless communication.

For example, miniature radio frequency (RF) communication systems allow computer users to connect to networks without a physical connection to a telephone line. Using such RF system it is possible, for example, to access electronic mail systems. This allows for great flexibility, for example, to users who are traveling.

RF transmission is also used for short range data transmissions, for example through an RF local area network (LAN). One disadvantages of RF LANs is that, due to the nature of RF circuits, systems which use RF LANs are currently very expensive. Additionally, RF LANs may be subject to FCC restrictions. Additionally, it is currently difficult to assure data security across RF LANs.

Another form of wireless communication is infrared (IR) data transmission. Systems which operate in accordance with the Infrared Data Association (IrDA) physical layer specifications can perform peer-to-peer data communication at a rate of transmission up to 115.2 kilobits per second. Systems which operate in accordance with the IrDA-Extended physical layer specifications can perform peer-to-peer data communication at a rate of transmission up to 4 megabits per second.

Typically, modules are used to implement the IrDA and the IrDA-Extended physical layer. These modules generally include a light emitting diode (LED) used for data transmission, a photo diode used for data reception, and an integrated circuit which contains an LED drive, amplifiers and a quantizer. Existing infrared data transmission modules which implement IrDA-Extended data transmission are available, for example from Siemens Corporation having a business address of 19000 Homestead Road Cupertino, Calif. 95014; Irvine Sensors Corporation, having a business address of 3001 Redhill Avenue, Building III Costa Mesa, Calif. 92626; Hewlett-Packard Company having a business address of 3000 Hanover Street, Palo Alto, Calif. 94043; and Temic Telefunken Microelectronic GmbH, Theresienstrasse 2 Postfach 3535, 74025 Heilbronn, Germany.

Typically, currently available modules are soldered on the top of a printed circuit (PC) board. Typically, the modules extend at least three to six millimeters above the printed circuit board. However, for some applications, such as PCMCIA cards type 2, a clearance of only 2.7 millimeters is available. This is too small a clearance to allow the use of currently available modules.

SUMMARY OF THE INVENTION

In accordance with the preferred embodiment of the present invention, an optical send-receive module is shown. The optical send-receive module includes a frame which has a front section, a back side, and a top section. A lens carrier is attached to the front section of the frame. The lens carrier includes one or more lenses which face forward. An integrated circuit carrier is placed within the top section of the frame. First metal leads electrically connect components within the lens carrier to an integrated circuit within the integrated circuit carrier. Second metal leads extend from the integrated circuit carrier, along the top section of the frame, down the back side of the frame and are bent under the frame.

In the preferred embodiment first slots are placed along the back side of the frame. The second metal leads are placed in the first slots. Also, the frame includes second slots along the top section. The first metal leads are placed in the second slots. Also, the lens carrier is attached to the front section of the frame so that a bottom of the lens carrier extends down below a bottom of the top section of the frame.

The frame is manufactured, for example, using high temperature injection molded plastic. The lens carrier and a universal chip carrier are transfer molded epoxy so that they are co-planar and are connected by the first set of metal leads. The lens carrier and the universal chip carrier are placed within the frame. The lens carrier is attached to the front section of the frame. The first set of metal leads is bent so that lenses included within the lens carrier face forward. The second metal leads are bent so that they extend from the integrated circuit carrier, along the top section of the frame, down the back side of the frame and under the frame. The lens carrier is attached to the front section of the frame so that the bottom of the lens carrier extends down below the bottom of the top section of the frame.

The optical send-receive module may be connected to a printed circuit board in at least three ways. For example, using a first attachment option, the bottom of the top section of the frame rests on the printed circuit board. The front section of the frame extends over a side of the printed circuit board so that the bottom of the lens carrier extends down below the top of the printed circuit board.

Alternatively, using a second attachment option, the bottom of the top section of the frame rests on the printed circuit board. The front section of the frame extends down inside a cut out portion of the printed circuit board so that the bottom of the lens carrier extends down below the top of the printed circuit board. Using a third attachment option, the frame is flipped over so that a top of the top section of the frame rests on the printed circuit board.

Modules manufactured according to the various embodiments of the present invention have several significant features which make them superior to what is available in the prior art. For example, the modules have a relatively low manufacturing cost and yet may be placed on a printed circuit board with high precision. The modules may be used to house single or multiple general purpose optical ports for light emitting diodes, lasers, sensors and so on. The modules make for a very compact package format with leads as part of the package. The modules have a minimal footprint, yet have large area on the top and bottom which may be used for pick-and-place during assembly of printed circuit boards. The modules may be mounted to have a very low profile so that they are ideal for use with PCMCIA II cards, personal digital assistants (PDAs) and other small-sized devices. The modules may be mounted on top of a printed circuit board simply by flipping the module upside down. The modules also may be mounted both recessed and lowered on the edge of printed circuit board. Alternatively, the modules may be mounted lowered with lenses extending over the edge of a printed circuit board. The module is compatible with printed circuit boards of any thickness.

The module according to the present invention is also ideal for automated mounting. The module self-aligns in the horizontal and vertical axis during mounting and soldering. There is minimized anti-parallelism. The optical axis is always perfectly adjusted to the surface and edge of the printed circuit board. There are no guide pins needed for mounting. No mechanical stress is placed on the metal leads when mounting the module. There is no uphill or downhill push required when mounting the modules.

DESCRIPTION OF THE PREFERRED EMBODIMENT

Figure 1A:
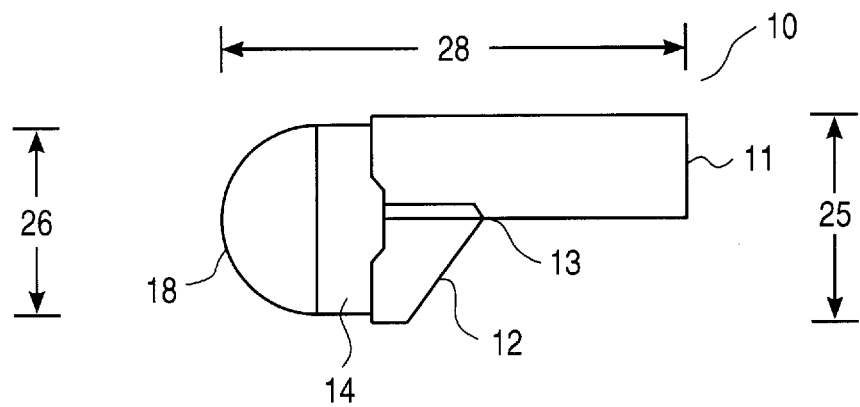
FIGS. 1A and 1B show, respectively, a side view and a top view of an optical service mount technology (SMT) send/receive module, in accordance with a preferred embodiment of the present invention.
Figure 1B:
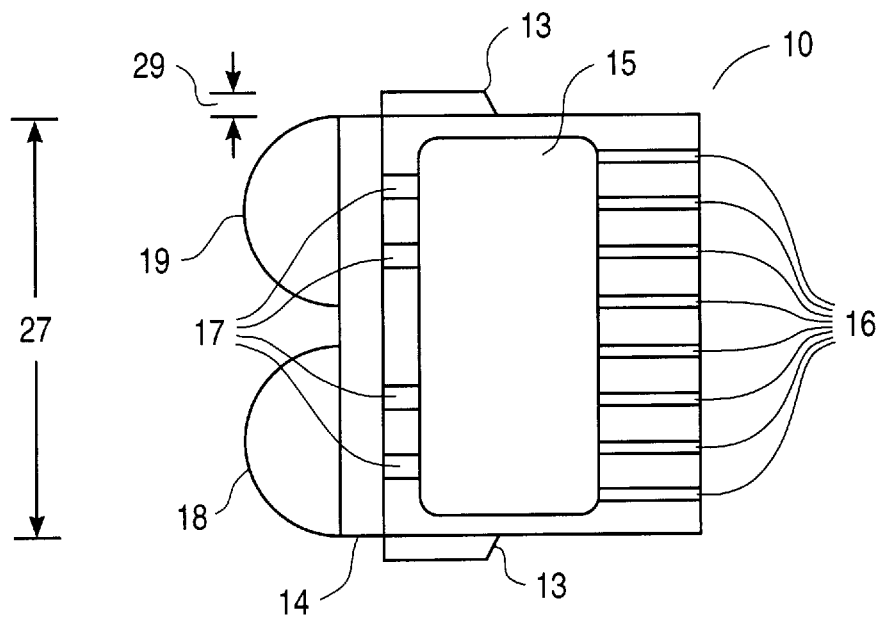

FIGS. 1A and 1B show, respectively, a side view and a top view of an optical surface mount technology (SMT) send/receive module 10, in accordance with a preferred embodiment of the present invention. Optical SMT send/receive module 10 has a total length 28 of, for example, 14 millimeters. Optical SMT send/receive module 10 includes a frame 11 which holds in place a lens carrier 14. Frame 11 is composed of high temperature injection molded plastic. Frame 11 has a total height 25 of, for example, 4.5 millimeters. Lens carrier 14 includes a light emitting diode lens 18 which houses a light emitting diode, and includes a photo diode lens 19 which houses a photo diode. Lens carrier 14 has a height 26 of, for example, 4 millimeters and a length 27 of, for example, 14 millimeters.

An alignment portion 12 of frame 11 is used to align optical SMT send/receive module 10 when optical SMT send/receive module 10 is mounted so that it hangs over a printed circuit board or when optical SMT send/receive module 10 is mounted within a cut-out portion of a printed circuit board. Wing portions 13 of frame 11 are used to correctly settle optical SMT send/receive module 10 on a printed circuit board when optical SMT send/receive module 10 is mounted within a cut-out portion of the printed circuit board. Each wing portion 13 extends out a distance 29 of, for example 0.6 millimeters.

A universal chip carrier 15 contains an integrated circuit which includes an LED drive, amplifiers and a quantizer. In addition universal chip carrier 15 contains several capacitors. Universal chip carrier 15 is electrically connected to the light emitting diode and the photo diode within lens carrier 14 through metal leads 17. Universal chip carrier 15 may be electrically connected to a printed circuit board through metal leads 16. Metal leads 16 travel across the top of optical SMT send/receive module 10, down the back of optical SMT send/receive module 10, and extend underneath optical SMT send/receive module 10.

Figure 2A:
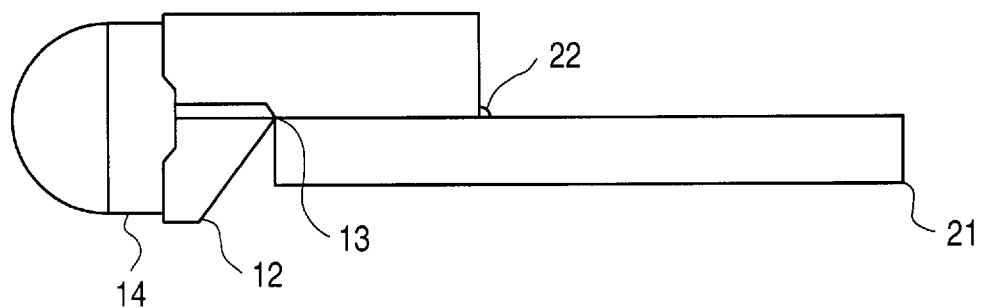
FIGS. 2A and 2B show, respectively, a side view and a top view of the optical SMT send/receive module shown in FIG. 1, mounted so that it hangs over the edge of a printed circuit board, in accordance with a preferred embodiment of the present invention.
Figure 2B:
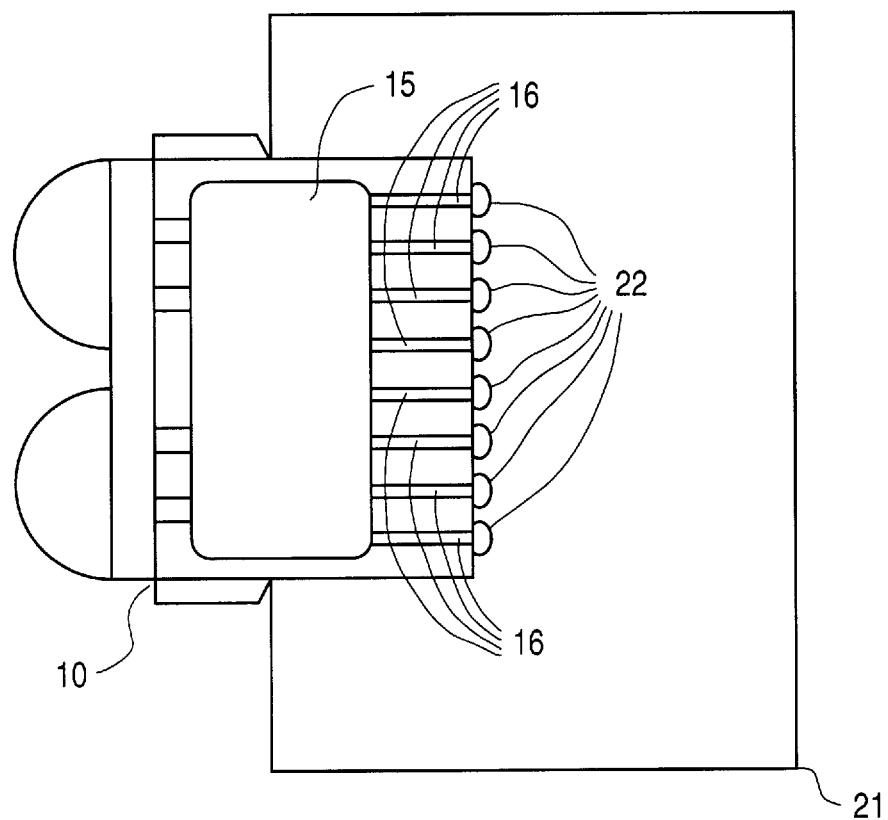

FIGS. 2A and 2B show, respectively a side view and a top view of optical SMT send/receive module 10 mounted so that it hangs over the edge of a printed circuit board 21, in accordance with a preferred embodiment of the present invention. Alignment portion 12 of frame 11 allows optical SMT send/receive module 10 to be self-aligned when optical SMT send/receive module 10 is mounted on printed circuit board 21. Leads 16 are soldered to printed circuit board 21 at the bottom corner of optical SMT send/receive module 10 where leads 16 extend underneath optical SMT send/receive module 10, forming solder piles 22.

Figure 3A:
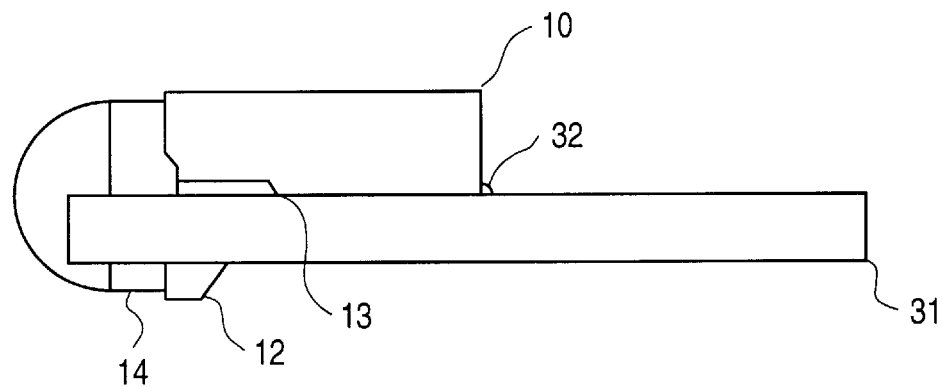
FIGS. 3A and 3B show, respectively, a side view and a top view of the optical SMT send/receive module shown in FIG. 1, mounted so that it is within a cut out space of a printed circuit board, in accordance with another preferred embodiment of the present invention.
Figure 3B:
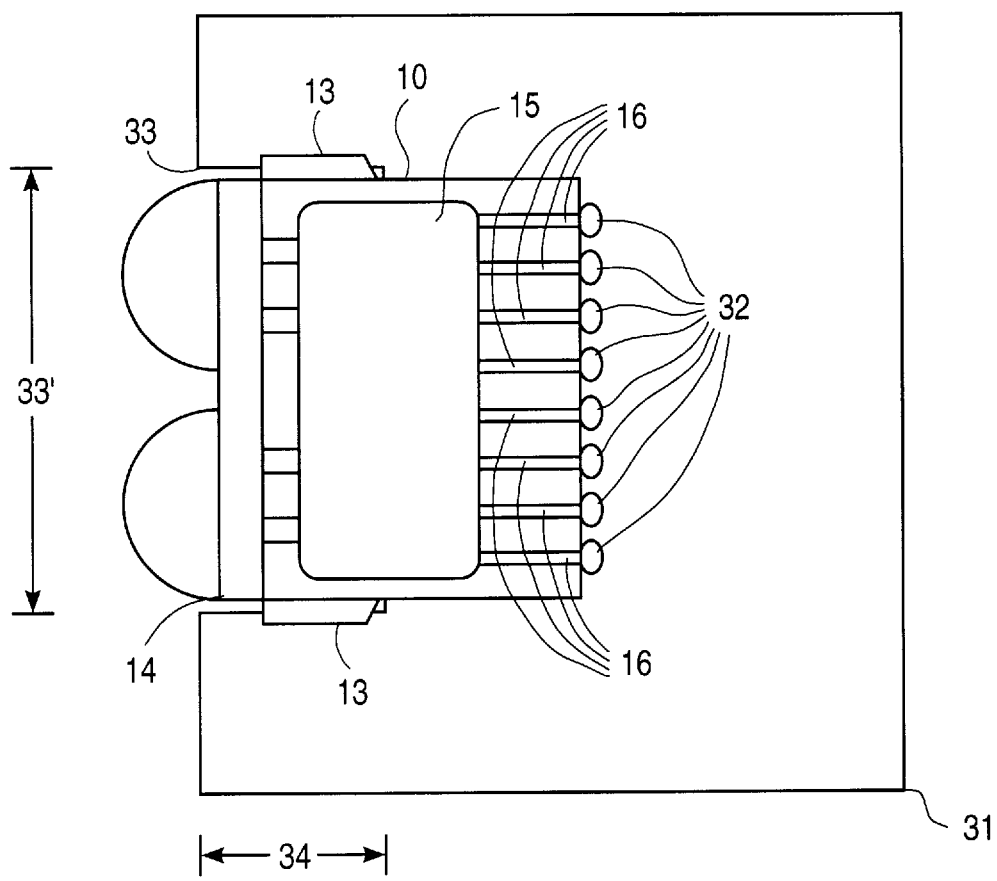

FIGS. 3A and 3B show, respectively, a side view and a top view of optical SMT send/receive module 10 mounted so that it is within a cut out space 33 of a printed circuit board 31, in accordance with another preferred embodiment of the present invention. Cut out space 33 has a length 33' of, for example, 13 millimeters and extends into printed circuit board 31 a depth 34 of, for example, 4 millimeters.

Wing portions 13 of frame 11 rest on printed circuit board 31 giving additional stability to optical SMT send/receive module 10. Alignment portion 12 of frame 11 allows optical SMT send/receive module 10 to be self-aligned when optical SMT send/receive module 10 is mounted on printed circuit board 31. Leads 16 are soldered to printed circuit board 31 at the bottom corner of optical SMT send/receive module 10 where leads 16 extend underneath optical SMT send/receive module 10, forming solder piles 32.

Figure 4A:
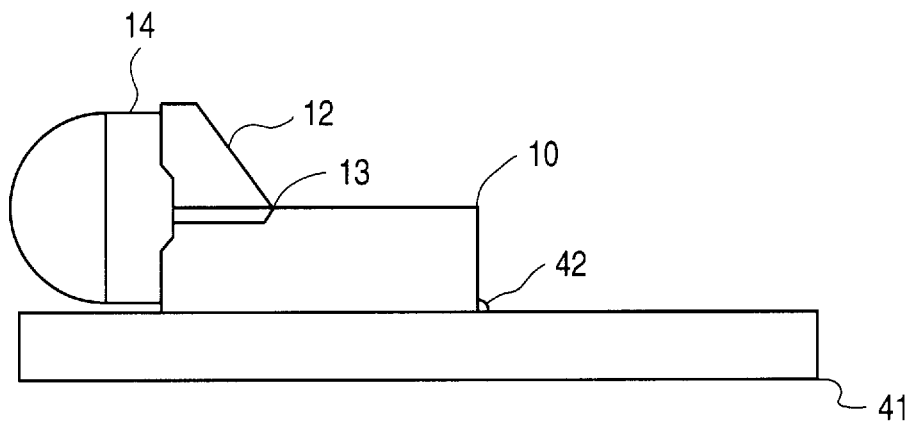
FIGS. 4A and 4B show, respectively, a side view and a top view of the optical SMT send/receive module shown in FIG. 1, mounted on top of a printed circuit board, in accordance with another preferred embodiment of the present invention.
Figure 4B:
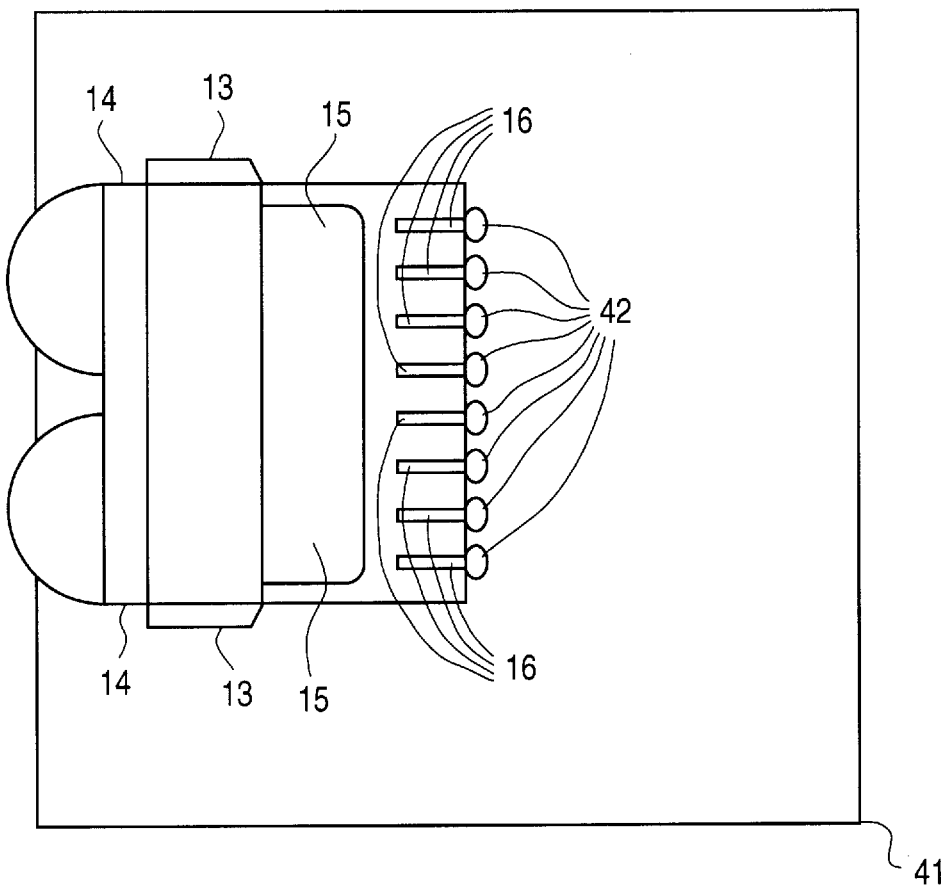

FIGS. 4A and 4B show, respectively, a side view and a top view of optical SMT send/receive module 10 flipped over and mounted on top of a printed circuit board 41, in accordance with another preferred embodiment of the present invention. Leads 16 are soldered to printed circuit board 41 at the corner of optical SMT send/receive module 10 where leads 16 contact printed circuit board 41, forming solder piles 42.

Figure 5:
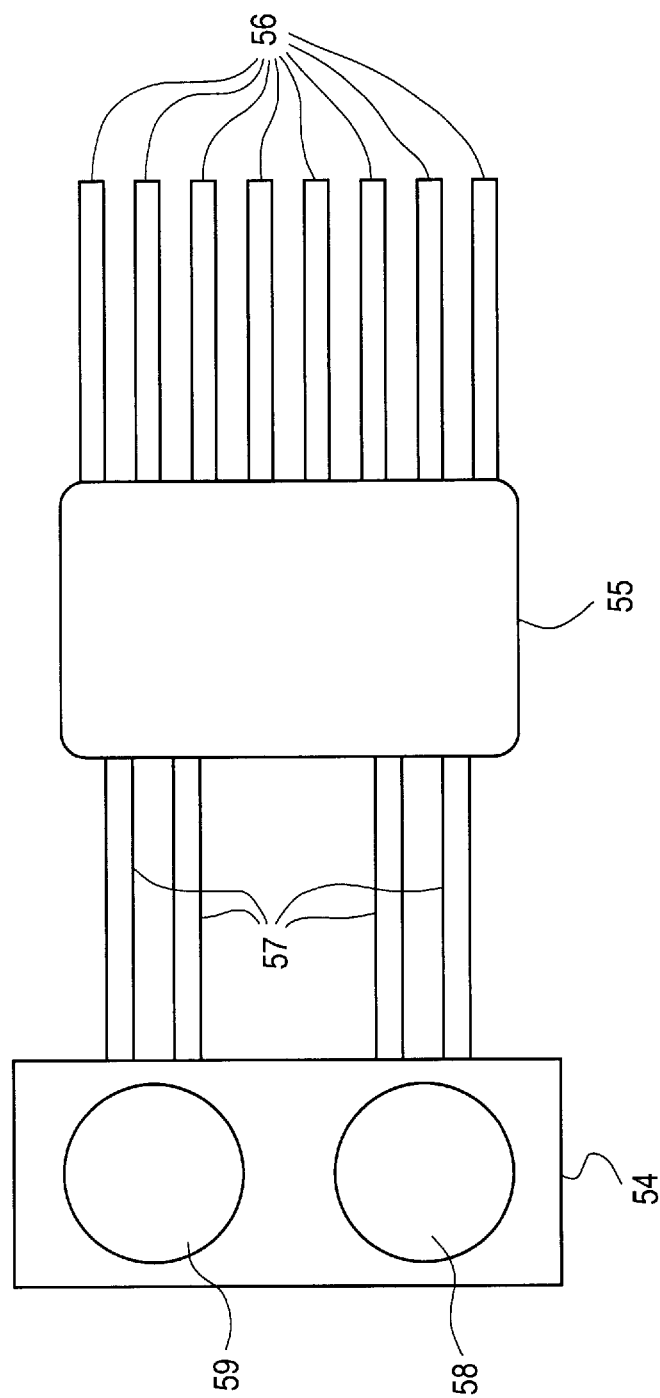
FIG. 5 shows an LED and photo diode within a lens carrier and an integrated circuit within a universal chip carrier ready for assembly in accordance with a preferred embodiment of the present invention.

FIG. 5 shows a top view of lens carrier 54 and a universal chip carrier 55. Lens carrier 54 includes a light emitting diode lens 58 which houses a light emitting diode, and includes a photo diode lens 59 which houses a photo diode. A universal chip carrier 55 contains an integrated circuit which includes an LED drive, amplifiers and a quantizer. Universal chip carrier 55 also contains several capacitors.

During manufacturing lens carrier 54 and universal chip carrier 55 are transfer molded epoxy around their components thus enclosing all shock sensitive semiconductor parts and bonding leads. The integrated circuit within universal chip carrier 55 is electrically connected to the light emitting diode and the photo diode within lens carrier 54 through metal leads 57. Metal leads 56 will be used to connect the integrated circuit within universal chip carrier 55 to a printed circuit board. Initially, before being joined to a frame, lens carrier 54 and universal chip carrier 55 are co-planar.

Figure 6:
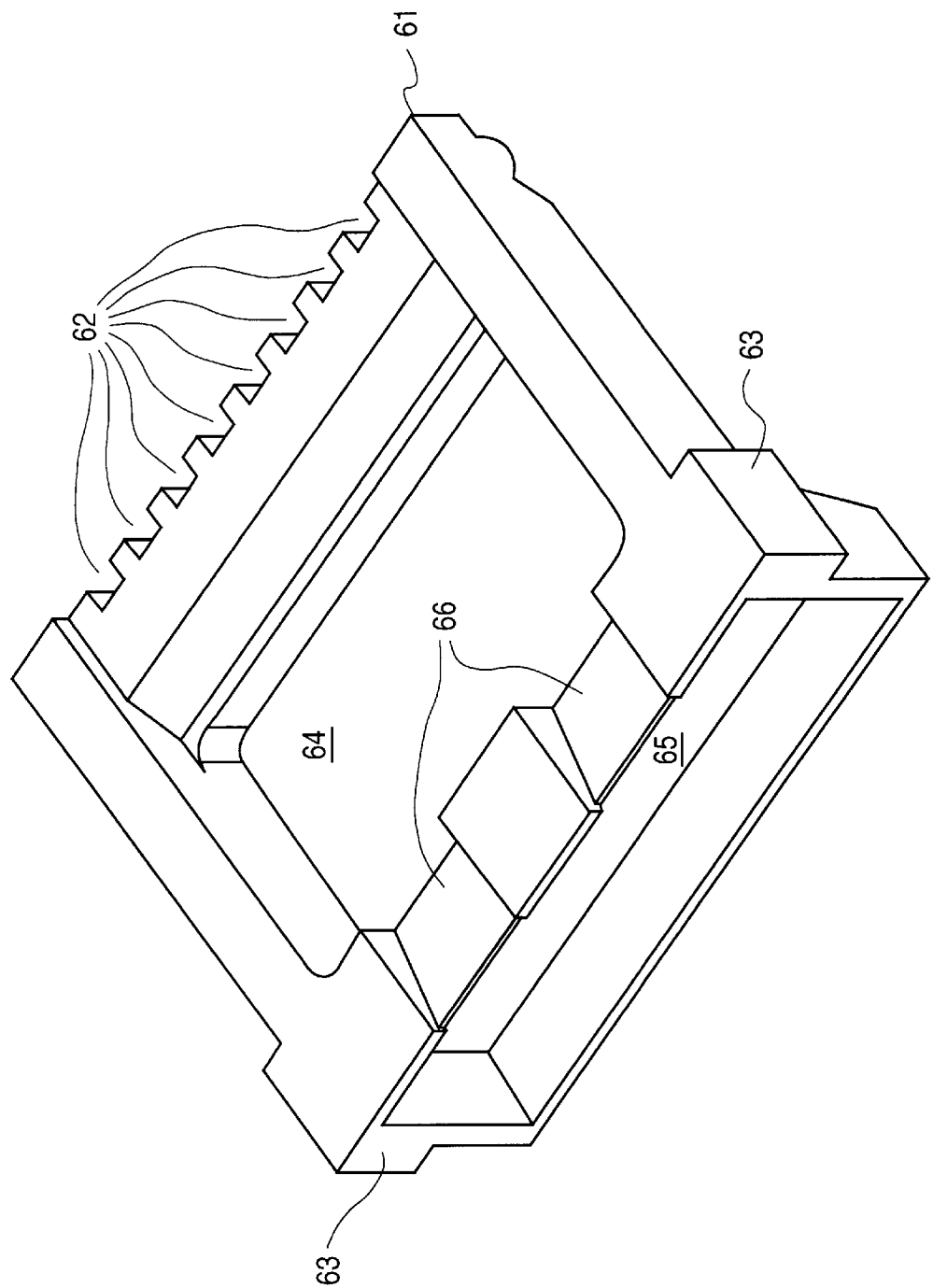
FIG. 6 shows a top-front view of a frame for a optical SMT send/receive module, in accordance with a preferred embodiment of the present invention.

FIG. 6 shows a top-front view of a frame 61 for an optical SMT send/receive module. Frame 61 is high temperature plastic injection molded. Frame 61 includes slots 62 in which will be placed metal leads 56. Frame 61 also includes slots 66 in which will be placed metal leads 57. A slot 65 is ready to receive a lens carrier. An opening 64 is ready to receive a universal chip carrier.

Figure 7:
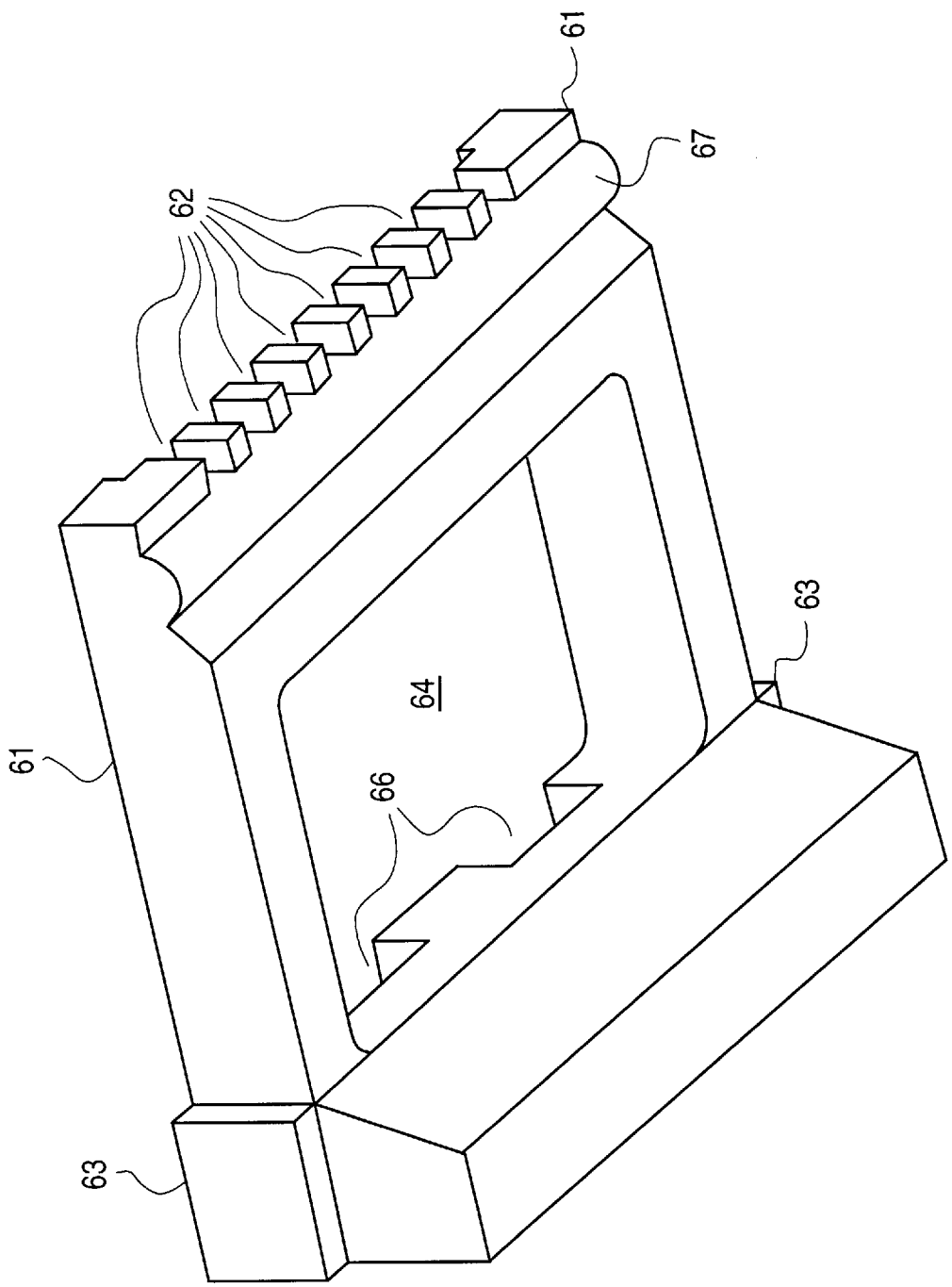
FIG. 7 shows a bottom view of the frame shown in FIG. 6, in accordance with a preferred embodiment of the present invention.

FIG. 7 shows a bottom view of frame 61. As also shown in the top-front view of frame 61, frame 61 includes slots 62 in which will be placed metal leads 56 and slots 66 in which will be placed metal leads 57. Metal leads 56 will be j-bent over mounting surface 67. Opening 64 is ready to receive a universal chip carrier.

Figure 8:
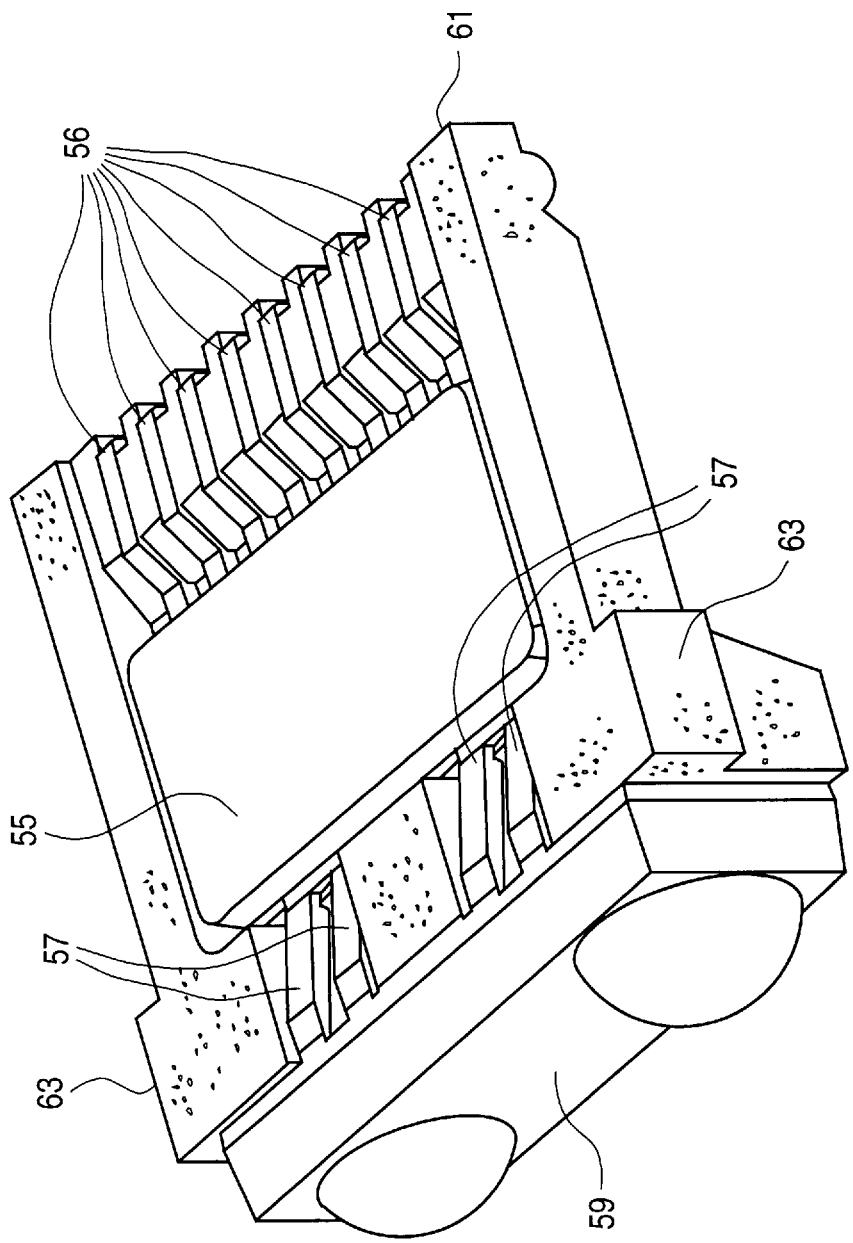
FIG. 8 shows a top view of an assembled optical SMT send/receive module, in accordance with a preferred embodiment of the present invention.

FIG. 8 shows a top-front view of the assembled optical SMT send/receive module. Metal leads 57 have been bent so that lens carrier 54 can be placed within slot 65. Universal chip carrier 55 has been placed within opening 64. Metal leads 57 have been placed within slots 66. Metal leads 56 have been bent so that they go around the back of frame 61, through slots 62 and are j-bent over a mounting surface 67 (shown in FIG. 9).

Figure 9:
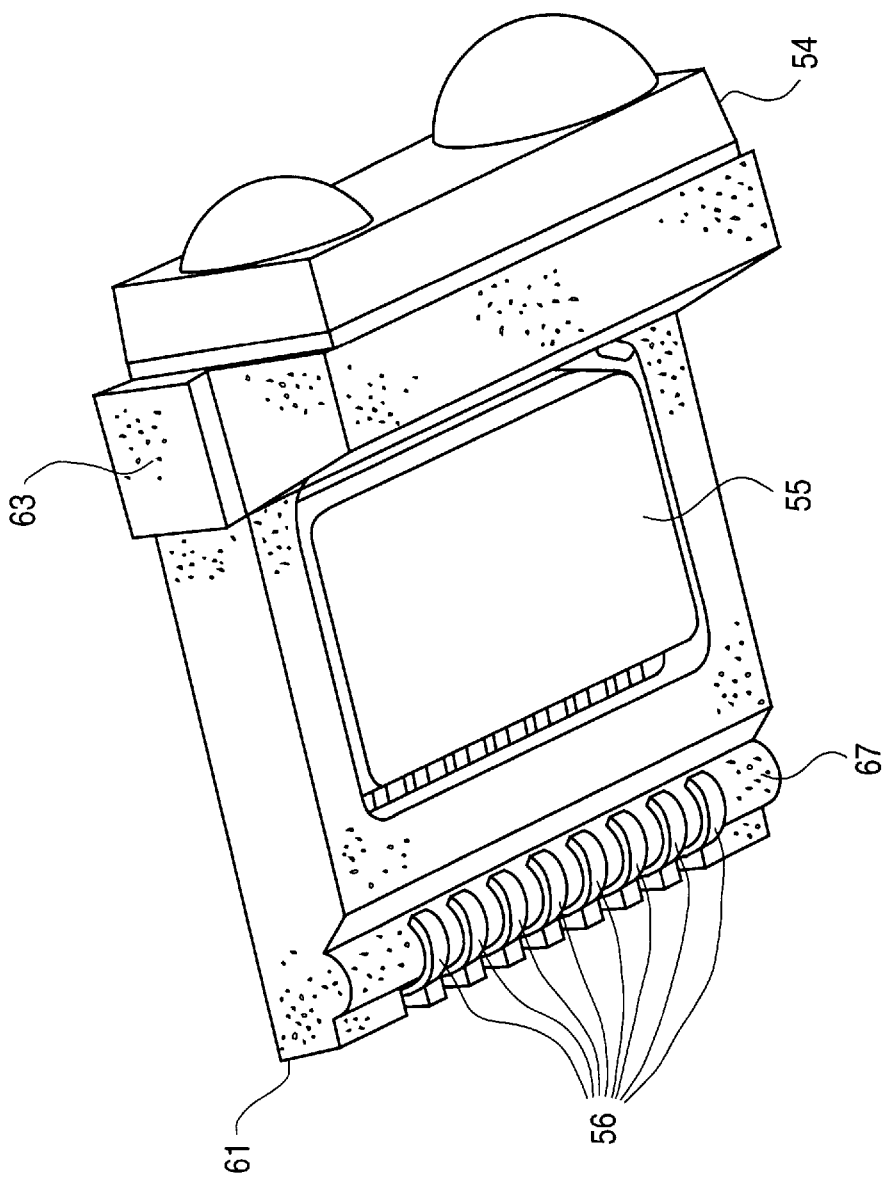
FIG. 9 shows a bottom view of the assembled optical SMT send/receive module shown in FIG. 8, in accordance with a preferred embodiment of the present invention.

FIG. 9 shows a bottom view of the assembled optical SMT send/receive module. The bottom of universal chip carrier 55 is seen within opening 64. As shown in FIG. 9, metal leads 56 have been bent so that they go around the back of frame 61, through slots 62 and are j-bent over mounting surface 67.

While the preferred embodiment discussed above includes an optical SMT send/receive module which has both a light emitting diode and a photo diode, the principles of the present invention may be adapted to any module used in wireless communication.

Figure 10A:
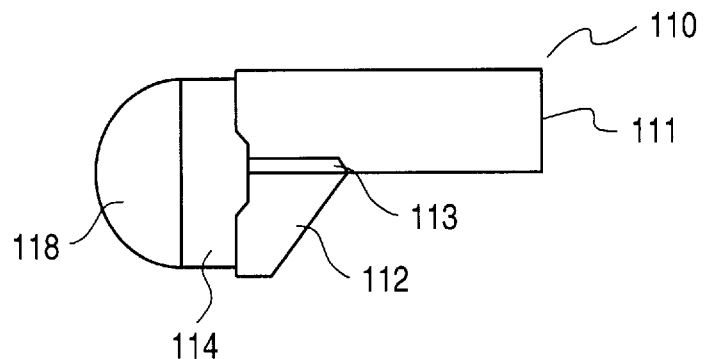
FIGS. 10A and 10B show, respectively, a side view and a top view of a module used for wireless communication, in accordance with an alternate embodiment of the present invention.
Figure 10B:
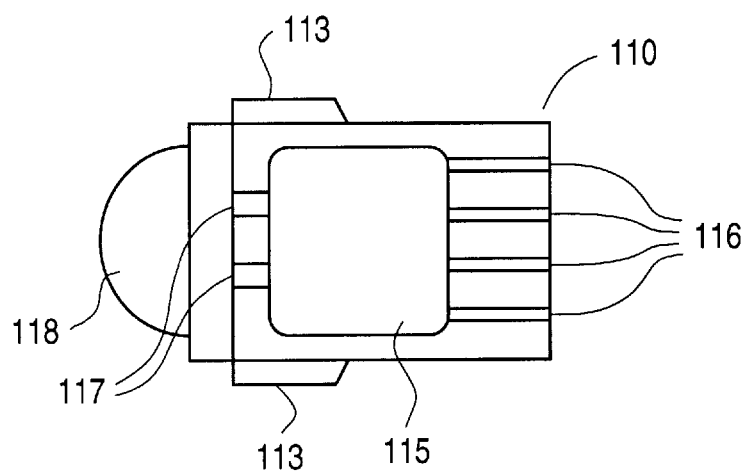

For example, FIGS. 10A and 10B show, respectively, a side view and a top view of a module 110 which is used in wireless communication, in accordance with an alternate embodiment of the present invention. Module 110 includes a frame 111 which holds in place a lens carrier 114. Frame 111 is composed of high temperature injection molded plastic. Lens carrier 114 includes a lens 118 which may house, for example, a light emitting diode, a photo diode, or some other device used for wireless communication.

An alignment portion 112 of frame 111 is used to align module 110 when module 110 is mounted so that it hangs over a printed circuit board or when module 110 is mounted within a cut-out portion of a printed circuit board. Wing portions 113 of frame 111 is used to correctly settle module 110 on a printed circuit board when module 110 is mounted within a cut-out portion of the printed circuit board.

A universal chip carrier 115 contains an integrated circuit which includes components which control the device within lens 118. Universal chip carrier 115 is electrically connected to the device within lens carrier 114 through metal leads 117. Universal chip carrier 115 may be electrically connected to a printed circuit board through metal leads 116. Metal leads 116 travel across the top of module 110, down the back of module 110, and extend underneath module 110.

Figure 11:
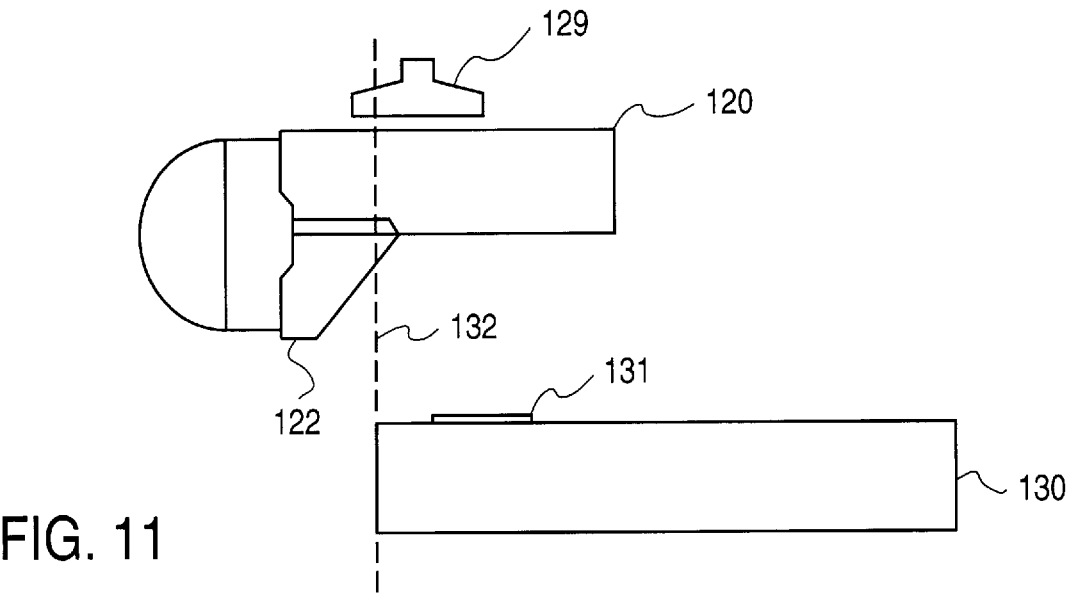
FIG. 11, FIG. 12 and FIG. 13 illustrate placement of a module upon a printed circuit board in accordance with a preferred embodiment of the present invention.
Figure 12:
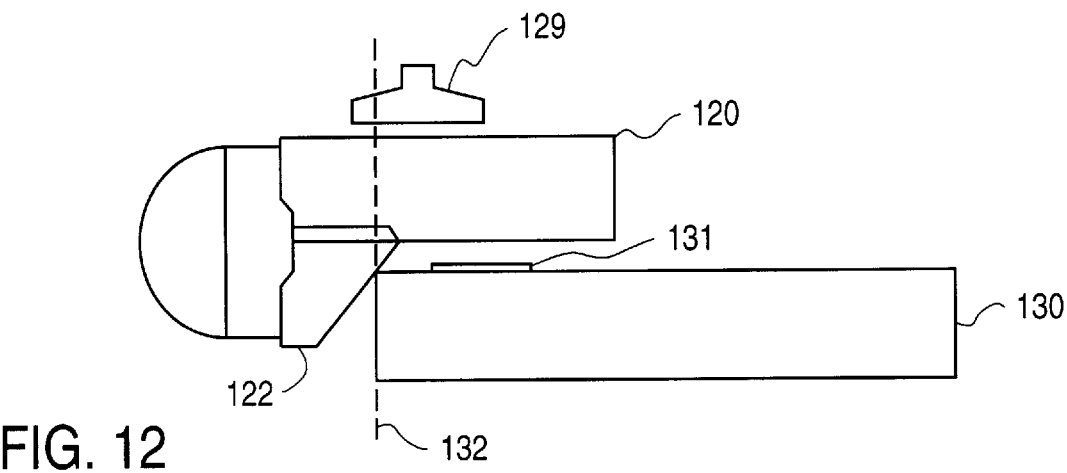
Figure 13:
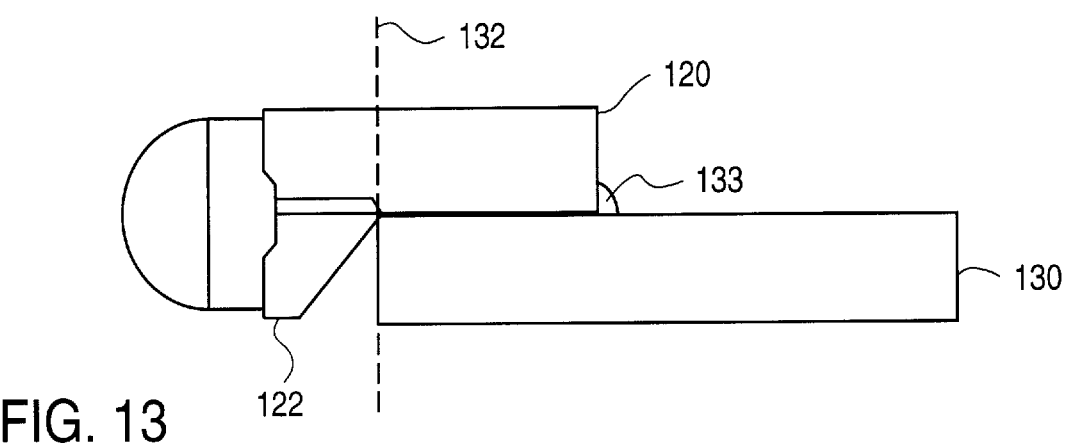

FIG. 11, FIG. 12 and FIG. 13 illustrate placement of a module upon a printed circuit board in accordance with a preferred embodiment of the present invention. In FIG. 11, a module 120 is held by a pick-and-place mechanism 129 in preparation for placement upon a printed circuit board 130. Glue 131 is placed on printed circuit board 130 in order to hold in place module 120. A vertical axis 132 shows location of the front edge of printed circuit board 130. An alignment portion 122 of module is used to align module 120 as module 120 is placed on printed circuit board 130.

In FIG. 12, module 120 has been moved by pick-and-place mechanism 129 to contact printed circuit board 130. As alignment portion 122 comes into contact with printed circuit board 130, the slope of alignment portion 122 causes module 120 to be placed on printed circuit board 130 in proper alignment.

In FIG. 13, module 120 has been placed in proper alignment upon printed circuit board 130. Glue 131 (shown in FIGS. 11 and 12) holds module 120 in place. Solder 133 is used to electrically connect metal leads of module 120 to contacts on printed circuit board 130.

What is claimed is:

1. An optical send-receive module comprising:
    a frame having a front, a back side, and a top section;
    a lens carrier attached to the front of the frame, the lens carrier including a lens which faces forward;
    an integrated circuit carrier placed within the top section of the frame;
    first metal leads which electrically connect components within the lens carrier to an integrated circuit within the integrated circuit carrier; and,
    second metal leads which extend from the integrated circuit carrier, along the top section of the frame, down the back side of the frame and extend under the frame.

2. An optical send-receive module as in claim 1, wherein the frame additionally includes:
    first slots along the back side of the frame, the second metal leads being placed in the first slots.

3. An optical send-receive module as in claim 2, wherein the frame includes second slots along the top section, the first metal leads being placed in the second slots.

4. An optical send-receive module as in claim 1, wherein the lens carrier is attached to the front of the frame so that a bottom of the lens carrier extends down below a bottom of the top section of the frame.

5. An optical send-receive module as in claim 1, wherein the lens carrier includes a first lens which houses a light emitting diode and a second lens which houses a photo diode.

6. A method for manufacturing an optical send-receive module comprising the following steps:
    (a) forming a frame, the frame having a front section, a back side, and a top section;
    (b) molding a lens carrier and a universal chip carrier, the lens carrier and universal chip carrier being co-planar and being connected by a first set of metal leads, a second set of metal leads extending out from the universal chip carrier; and,
    (c) placing the lens carrier and the universal chip carrier within the frame, wherein the lens carrier is attached to the front section of the frame, and the first set of metal leads are bent so that a lens included within the lens carrier faces forward, and the second metal leads are bent so that they extend from the universal chip carrier, along the top section of the frame, down the back side of the frame and extend under the frame.

7. A method as in claim 6 wherein:

step (a) includes forming first slots along the back side of the frame; and, step (b) includes placing the second metal leads in the first slots.

8. A method as in claim 7 wherein:

step (a) includes forming second slots along the top section of the frame: and, step (b) includes placing the first metal leads in the second slots.

9. A method as in claim 6 wherein step (c) includes attaching the lens carrier to the front section of the frame so that a bottom of the lens carrier extends down below a bottom of the top section of the frame.

10. A method as in claim 9 additionally comprising the following step:

(d) attaching the frame to a printed circuit board, the bottom of the top section resting on the printed circuit board, the front section extending over a side of the printed circuit board so that the bottom of the lens carrier extends down below a top of the printed circuit board.

11. A method as in claim 9 additionally comprising the following step:

(d) attaching the frame to a printed circuit board, the bottom of the top section resting on the printed circuit board, the front section extending down inside a cut out portion of the printed circuit board so that the bottom of the lens carrier extends down below a top of the printed circuit board.

12. A method as in claim 6 additionally comprising the following step:

(d) attaching the frame to a printed circuit board, the frame being flipped over so that a top of the top section rests on the printed circuit board.

13. A module used for wireless communication, the module comprising:

a frame having a front, a back side and a top section;

a lens carrier attached to the front of the frame, the lens carrier including a lens which faces forward;

an integrated circuit carrier placed within the top section of the frame;

first metal leads which connect the lens carrier to an integrated circuit within the integrated circuit carrier; and, second metal leads which extend from the integrated circuit carrier, along the top section of the frame, down the back side of the frame and are bent under the frame.

14. A module as in claim 13 wherein the frame additionally includes:

first slots along the back side of the frame, the second metal leads being placed in the first slots.

15. A module as in claim 14 wherein the frame includes second slots along the top section, the first metal leads being placed in the second slots.

16. A module as in claim 13 wherein the lens carrier is attached to the front of the frame so that a bottom of the lens carrier extends down below a bottom of the top section of the frame.

* * * * *